United States Patent
Sethi et al.

(10) Patent No.: US 10,218,551 B1
(45) Date of Patent: Feb. 26, 2019

(54) SOFT INFORMATION MEASUREMENT IN BLUETOOTH LONG RANGE

(71) Applicant: Marvell International Ltd., Hamilton (BM)

(72) Inventors: Ankit Sethi, Maharashtra (IN); Vijay Ganwani, Maharashtra (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/783,834

(22) Filed: Oct. 13, 2017

Related U.S. Application Data

(60) Provisional application No. 62/408,659, filed on Oct. 14, 2016.

(51) Int. Cl.
   *H04B 1/52* (2015.01)
   *H04L 27/233* (2006.01)
   *H04L 27/20* (2006.01)

(52) U.S. Cl.
   CPC ...... *H04L 27/2335* (2013.01); *H04L 27/2017* (2013.01); *H04L 27/2082* (2013.01)

(58) Field of Classification Search
   CPC ............ H04L 27/2035; H04L 27/2275; H04L 27/2017; H04L 27/2082; H04L 2025/03407; H04B 1/707
   USPC .................. 375/284, 324, 334, 340; 714/755
   See application file for complete search history.

(56) References Cited

U.S. PATENT DOCUMENTS

| | | | |
|---|---|---|---|
| 9,699,011 B1 * | 7/2017 | Sethi | H04L 27/2017 |
| 2009/0175384 A1 * | 7/2009 | Perrins | H04L 25/03184 |
| | | | 375/324 |

* cited by examiner

*Primary Examiner* — Khai Tran

(57) ABSTRACT

A device includes a frequency offset (FO) compensation circuit coupled with a decoder, and a soft information measurement circuit. The frequency offset compensation circuit is configured to: (i) receive a continuous phase modulation (CPM) signal, (ii) adjust the CPM signal in a sampling window based on a frequency offset compensation value, and (iii) provide the adjusted CPM signal to the decoder. The decoder is configured to: (i) receive the adjusted CPM signal generated by the FO compensation circuit, (ii) decode the adjusted CPM signal to obtain one or more information symbols associated with the CPM signal, (iii) provide the one or more information symbols for soft information generation; and (iv) receive soft information provided by the soft information measurement circuit.

25 Claims, 6 Drawing Sheets

SOFT INFORMATION MEASUREMENT IN BLUETOOTH LONG RANGE

CROSS REFERENCE TO RELATED APPLICATIONS

This application claims the benefit of priority under 35 U.S.C. § 119(e) of U.S. Provisional Application No. 62/408,659, filed on Oct. 14, 2016, and entitled "SOFT INFORMATION MEASUREMENT IN BLUETOOTH LONG RANGE," which is incorporated herein by reference in its entirety.

This application is related to U.S. patent application Ser. No. 15/097,026, entitled "CONTINUOUS PHASE MODULATION SIGNALING", filed Apr. 12, 2016, now U.S. Pat. No. 9,699,011, which is incorporated herein by reference in its entirety.

BACKGROUND

The following disclosure relates generally to systems and techniques for measuring soft information in in systems that use wireless communication protocols, such as Bluetooth long range.

Newer wireless networking technologies, such as Bluetooth 5.0, have been developed that are capable of operating at longer ranges and having comparatively lower device power consumption than some existing short-range wireless systems. These longer range wireless technologies are usable to extend the communication range that is achieved with some legacy wireless technologies, such as some legacy Bluetooth standards. For example, Bluetooth low energy (BLE), realizes lower power consumption over the same range as compared to some existing Bluetooth technologies, but with lower bandwidth. Comparatively, Bluetooth 5 now adds higher speed (2 Mbps) to BLE. Bluetooth long range (BLR) potentially improves wireless communication range strength by approximately to approximately 100 m, which was limited to shorter ranges (e.g., 10 meters) by some short range Bluetooth technologies.

SUMMARY

The present disclosure relates generally to systems and techniques for measuring soft information in systems that use wireless communication protocols, such as Bluetooth long range. Soft information can be provided as data supplemental to encoded information used by the receiver to improve accuracy and robustness of its signal processing functions, such as decoding and error correction. For example, soft information of a received bit provides a confidence measure about the value of the bit (e.g., the value being 0 or 1). The soft information is measured for encoded bits of a communications signal that is received at a communications receiver device, where the communications signal is modulated using continuous phase modulation (CPM).

According to an aspect of the described systems and techniques, a device includes: a frequency offset (FO) compensation circuit; a decoder coupled with the FO compensation circuit; and a soft information measurement circuit coupled with the decoder. The frequency offset compensation circuit is configured to (i) receive a continuous phase modulation (CPM) signal, (ii) adjust the CPM signal in a sampling window based on a frequency offset compensation value, and (iii) provide the adjusted CPM signal to the decoder. The decoder is configured to (i) receive the adjusted CPM signal generated by the FO compensation circuit, (ii) decode the adjusted CPM signal to obtain one or more information symbols associated with the CPM signal, (iii) provide the one or more information symbols for soft information generation; and (iv) receive soft information provided by the soft information measurement circuit.

Particular implementations may include one or more of the following features. The one or more information symbols can be represented as values corresponding to states included in an array The soft information measurement circuit is configured to: determine a data rate that is one of a plurality of data rates including a first data rate and a second data rate; (ii) conditioned on determining that the data rate corresponds to the first data rate, compute soft information for each of the one or more information symbols corresponding to a time interval by applying a first group of operations to the array; and (iii) conditioned on determining that the data rate corresponds to the second data rate, compute soft information for a specified number of the one or more information symbols corresponding to a time interval by applying a second group of operations to the array.

The values corresponding to states included in the array are generated by correlating, for a time interval, samples of the CPM signal with a number of digital signals represented as elements of a correlated signal array. The time interval can be a symbol duration. The decoder is configured to: obtain the one or more information symbols by iteratively decoding the adjusted CPM signal after every symbol duration included in a total time period; and determine a number of states included in the array based on the total time period. Applying the first group of operations can include: calculating the squared magnitude of the array, a result of the calculation being represented as values in a magnitude array, and obtaining a difference between specified values of the magnitude array. Applying the second group of operations can include: calculating the squared magnitude of the array, a result of the calculation being represented as values in a magnitude array, and obtaining a summation of specified states of the magnitude array.

The decoder is further configured to convert at least one value corresponding to a specified state included in the array to a binary string including one or more bits. The soft information measurement circuit is further configured to provide the computed soft information to the decoder. The decoder is configured to (vi) perform optimized decoding of the received CPM signal using the soft information to obtain the one or more information symbols encoded therein. The CPM signal may include a Bluetooth signal. In some cases, the CPM signal is based on Gaussian Phase Shift Keying (GPSK) modulation.

The device can further include: a frequency offset (FO) estimation circuit that is configured to: (i) receive first phase values of the adjusted CPM signal, (ii) receive second phase values of a compensating signal, (iii) generate an uncompensated frequency offset for the given sampling window based on the first phase values of the adjusted CPM signal and the second phase values of the compensating signal, and (iv) provide the uncompensated frequency offset for the given sampling window to the frequency offset compensation circuit. The FO compensation circuit is further configured to: (iv) receive the uncompensated frequency offset for a given sampling window of the CPM signal, and (v) generate a frequency offset compensation value for a next sampling window of the CPM signal based on the uncompensated frequency offset for the given sampling window.

The device can further include: a compensating signal generator that is configured to: (i) receive one or more information symbols from the decoder; (ii) generate the second phase values of the compensating signal based on the one or more information symbols; and (iii) provide the second phase values of the compensating signal to FO estimation circuit. The FO estimation circuit is further configured to: (v) obtain information about a modulation index that is used for transmitting the CPM signal; (vi) obtain information about the sampling window; and (vii) generate the uncompensated frequency offset for the given sampling window based on the modulation index and the information about the sampling window. The device can further include: a phase differentiator circuit coupled between the frequency offset estimation circuit and the frequency offset compensation circuit, wherein the phase differentiator circuit is configured to: (i) receive the adjusted CPM signal; (ii) determine the first phase values of the adjusted CPM signal; and (iii) provide the first phase values of the adjusted CPM signal to the frequency offset estimation circuit.

According to another aspect of the described systems and techniques, a method includes: receiving, at an input of a frequency offset (FO) compensation circuit, a continuous phase modulation (CPM) signal; adjusting, by the FO compensation circuit, the CPM signal in a sampling window based on a frequency offset compensation value; providing, from an output of the FO compensation circuit, the adjusted CPM signal to a decoder. The method may further include: receiving, at an input of the decoder, the adjusted CPM signal generated by the FO compensation circuit; decoding the adjusted CPM signal to obtain one or more information symbols associated with the CPM signal; providing, from an output of the decoder, the one or more information symbols for soft information generation; and receiving, at another input of the decoder, soft information provided by a soft information measurement circuit.

The method can further include: determining, by the soft information measurement circuit, a data rate that is one of a plurality of data rates including a first data rate and a second data rate; conditioned on determining that the data rate corresponds to the first data rate, computing, by the soft information measurement circuit, soft information for each of the one or more information symbols corresponding to a time interval by applying a first group of operations to an array, wherein the one or more information symbols are represented as values corresponding to states included in the array; and conditioned on determining that the data rate corresponds to the second data rate, computing, by the soft information measurement circuit, soft information for a specified number of the one or more information symbols corresponding to a time interval by applying a second group of operations to the array.

The values corresponding to states included in the array are generated by correlating, for a time interval, samples of the CPM signal with a number of digital signals represented as elements of a correlated signal array. The method can also include: obtaining, by decoder, the one or more information symbols by iteratively decoding the adjusted CPM signal after every symbol duration included in a total time period; and determining, by the decoder, a number of states included in the array based on the total time period, wherein the time interval is a symbol duration.

Applying the first group of operations can include: calculating the squared magnitude of the array, a result of the calculation being represented as values in a magnitude array, and obtaining a difference between specified values of the magnitude array. Applying the second group of operations can include: calculating the squared magnitude of the array, a result of the calculation being represented as values in a magnitude array, and obtaining a summation of specified states of the magnitude array.

The method can also include: converting, by the decoder, at least one value corresponding to a specified state included in the array to a binary string including one or more bits. Also, the method includes providing, from an output of the soft information measurement circuit, computed soft information to the decoder; and performing, by the decoder, optimized decoding of the received CPM signal using the soft information to obtain the one or more information symbols encoded therein. In some cases, the CPM signal includes a Bluetooth signal.

Implementations of the above techniques include devices, systems, methods and computer program products. Such computer program products can be suitably embodied in a non-transitory machine-readable medium that stores instructions executable by one or more processors. The instructions are configured to cause the one or more processors to perform the above-described actions.

The systems and techniques disclosed in this application for measuring the soft information for encoded bits can lead to significant improvement in the sensitivity or the decoding ability of the receiver, compared to receiver devices that do not implement such techniques. The performance improvements can be manifested in improvements in the signal-to-noise ratio (SNR) of the received signal, or in reduced error flooring in bit error rate (BER) or packet error rate (PER) of the received signal. Use of the soft information, as disclosed herein, realizes an enhanced decoding algorithm to decode information symbols encoded in a received continuous phase modulation (CPM) signal for improved performance compared to other types of decoding schemes, e.g., maximum likelihood decoding schemes. The decoding algorithm including soft information measurement can help to improve the successful packet reception rate for incoming packets that use CPM signaling, and also improve the sensitivity and decoding frequency range of the receiver. The systems and techniques disclosed herein can also manifest improvements associated with compensating for a frequency offset in a communications signal that is received at a communications receiver device, where the communications signal is modulated using CPM.

The details of one or more disclosed implementations are set forth in the accompanying drawings and the description below. Other features, aspects, and advantages will become apparent from the description, the drawings and the claims.

DETAILED DESCRIPTION

Figure 1:
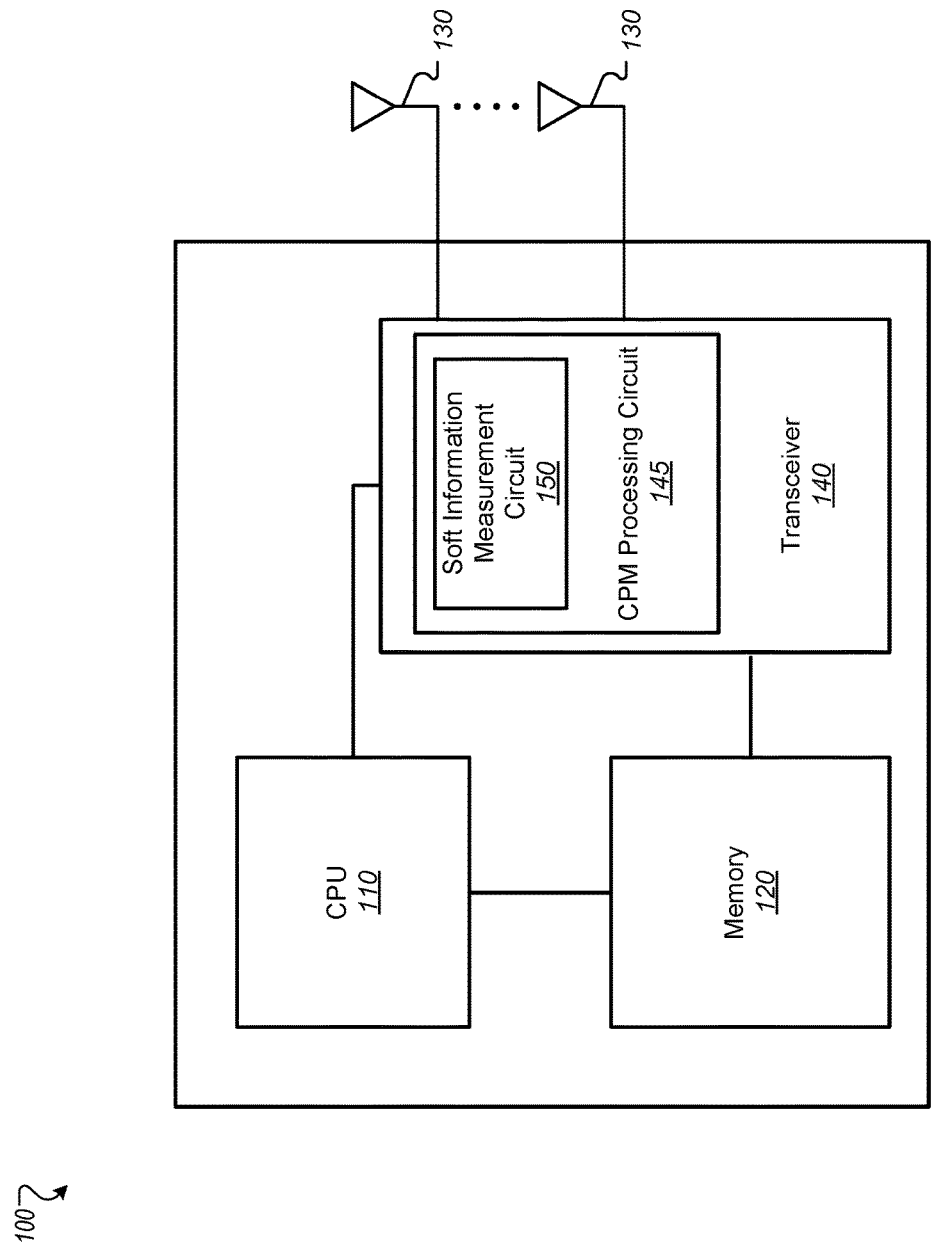
FIG. 1 illustrates an example of a block diagram of a device for processing CPM signals, including soft information measurement according to one or more implementations.

Continuous phase modulation (CPM) is a modulation technique in which the phase of the transmit carrier signal is modulated based on information symbols that are to be transmitted to a receiver device. CPM, which is used in some wireless communication standards like Bluetooth, enables communications in low power devices. In this context, an information symbol can be one of a pair of values +1 or −1. When CPM is used, a transmitter device uses a pulse-shaping filter to ensure a smooth transition of phase and to avoid abrupt changes in it. The pulse-shaping filter, which is known to the transmitter as well as the receiver, and the modulation index characterize the frequency spread of the CPM baseband signal. In this context, a CPM baseband signal refers to the analog CPM signal that modulates the carrier frequency.

A CPM baseband signal that is transmitted by a transmitter can be represented as:

$$x(t) = Ae^{j(\phi(t))} \quad (1)$$

where the phase of the signal $\phi(t)$ can be given by:

$$\phi(t) = h\pi \left[ \sum_{k=0}^{n-2} I_k + I_{n-1} q(t - (n-1)T) + I_n q(t - nT) \right] \quad (2)$$

$$q(t) = \int_0^t g(\tau) d\tau \quad (3)$$

In equation (1), A is the amplitude of the transmitted CPM baseband signal x(t). In equation (2), h is the modulation index for x(t); $I_k$ is the $k^{th}$ information symbol and T is the time duration for each symbol. In equation (3), g(t) represents the pulse-shaping filter.

As shown by equations (1) and (2), the information corresponding to the transmitted information symbols is present in the phase $\phi(t)$ of the CPM baseband signal. Accordingly, a receiver decodes the information symbols by processing the phase of the received CPM baseband signal.

In some situations, there can be a non-zero frequency offset between the transmitter and the receiver devices. The frequency offset can be, for example, due to frequency mismatch between the oscillators of the transmitter and the receiver, among other reasons. In some cases, the characteristics of these oscillators can be time varying, thereby causing the frequency offset between the transmitter and the receiver to be time varying. A CPM baseband signal that is received at a receiver when a frequency offset is present can be represented as:

$$r(t) = Ae^{j(\phi(t) + \phi_0 + 2\pi \int f(t) dt)} + n(t) \quad (4)$$

where r(t) is the received CPM baseband signal; $\phi(t)$ is the phase of the CPM signal as transmitted by the transmitter; $\phi_0$ is an initial phase offset; f(t) is frequency offset at time t; and n(t) is additive noise.

Equation (4) indicates that a frequency offset in the received CPM signal can affect the phase of the CPM signal. In such cases, if the receiver decodes the information symbols by processing the phase of the received CPM baseband signal without correcting for the frequency offset, there can be errors in the information symbols obtained by the receiver. The following sections describe components of a receiver device, and associated techniques, which are used to estimate the time varying frequency offset in a CPM baseband signal received at the receiver, so as to adjust (e.g., compensate) the received signal with the estimated frequency offset before decoding information symbols from the phase of the signal. The techniques for frequency offset estimation and compensation are designed to be robust to the additive noise n(t), such that these techniques work well at low SNR levels, and provide improved receiver sensitivity.

In some situations, a transmitter that uses CPM transmits packets using varying modulation index values that are changed from one transmitted packet to a next transmitted packet. In such cases, the receiver may not be aware of the modulation index value used by the transmitter for an incoming packet included in a received CPM baseband signal. If the receiver is able to estimate the modulation index used by the transmitter, then the performance of the receiver can be improved. For example, the techniques for frequency offset estimation and compensation can improve when varying modulation index values used in the received CPM signal, which are unknown to the receiver, are accurately estimated. The following sections describe components of the receiver device, and associated techniques, which are used to estimate the varying modulation index values for incoming packets included in a CPM baseband signal received at the receiver.

In some situations, a CPM baseband signal is corrupted during transmission from the transmitter to the receiver, e.g., due to noise in the transmission channel, or environmental impairments. The following sections describe components of the receiver device, and associated techniques, which are used to decode a corrupted CPM baseband signal that is received at the receiver, and accurately obtain the information symbols encoded in the phase of the signal.

FIG. 1 illustrates an example of a block diagram of a device 100 for processing CPM signals, including soft information measurement according to one or more implementations. The device 100 is a communications device that can transmit and/or receive signals with various modulation techniques, including CPM signals.

As shown in FIG. 1, the device 100 includes a central processing unit (CPU) 110, a memory unit 120, a transceiver 140 and one or more antennas 130 that are coupled to the transceiver 140. The CPU 110 can be a general purpose microprocessor, a microcontroller, or other suitable processing unit. In one or more implementations, the CPU 110 controls the transceiver 140 for processing CPM baseband signals that are received at the device 100.

The memory unit 120 can be a flash memory unit, a read-only memory (ROM) unit, a random access memory (RAM) unit, an Electrically Erasable Programmable Read Only Memory (EEPROM) unit, a hard disk, other suitable storage unit, or any combination thereof. The memory unit 120 stores various instructions that are executed by the CPU 110 for performing the operations of the device 100. In some implementations, the memory unit 120 stores instructions that are executed by the CPU 110 for controlling the operations of the transceiver 140. Such instructions can include estimating the frequency offset of a received CPM signal and compensating for the frequency offset; estimating the modulation index values for packet data include in a received CPM signal; or decoding information symbols from a received CPM signal, or any suitable combination of these. In some implementations, the instructions corresponding to the various operations of the transceiver 140 can be encoded in different firmware packages that are stored by the memory unit 120. The different firmware packages can be executed by various circuit components of the transceiver unit, which are described in greater detail in the following sections.

The transceiver 140 transmits and/or receives communications signals. In some implementations, the transceiver 140 uses CPM techniques for transmitting and/or receiving communications signals. For example, the transceiver 140 receives CPM signals from one or more transmitter devices and processes such signals.

The transceiver 140 interfaces with a wireless communications channel through one or more antennas 130 that are coupled to the transceiver unit. The one or more antennas 130 process radio frequency (RF) signals that are transmitted or received over the wireless communications channel. The RF signals processed by the antennas 130 include CPM signals that are transmitted and/or received by the transceiver 140. Additionally or alternatively, in some implementations, the transceiver 140 is coupled to a wired communications channel (e.g., a coaxial network cable) through one or more wired network interfaces.

When a CPM signal is received at the transceiver 140, e.g., through the wireless communications channel using the antennas 130, the CPM signal is processed by one or more circuit components included in the transceiver unit. As described in greater detail below, the circuit components perform various operations to: estimate the frequency offset of the received CPM signal and adjust or compensate for the estimated frequency offset; estimate varying modulation index values for the received CPM signal; or decode information symbols encoded in the phase of the CPM signal, or a suitable combination of these operations. The circuit components include separate hardware circuits, firmware packages, or implemented as software instruction modules executed by the CPU 110, or any suitable combination of these.

In some implementations, the device 100 is a single system-on-a-chip (SoC) with a built-in CPU 110, memory unit 120 and transceiver 140. In other implementations, the device 100 includes the CPU 110, the memory unit 120 and/or the transceiver 140 as separate physical units of the device.

In some implementations, the device 100 receives, from another transmitter device, a CPM baseband signal with an unknown frequency offset (e.g., due to a frequency mismatch between the transmitter and the device 100). In such implementations, the device 100 includes circuitry, shown in FIG. 1 as CPM processing circuit 145, which estimates the frequency offset of the CPM signal, and adjust (e.g., compensate) the received CPM signal using the estimated frequency offset. Additionally or alternatively, in some implementations, the device 100 receives, from a transmitter, a CPM baseband signal that includes varying values of modulation index (e.g., the modulation index values changing from packet to packet included in the CPM signal), that are unknown to the device 100. In such implementations, the device 100 estimates the modulation index values used in the received CPM signal. Additionally or alternatively, in some implementations, the device 100 receives a CPM baseband signal that is corrupted during transmission. In such implementations, the device 100 decodes information symbols from the phase of the received signal using resource-efficient decoding techniques. Moreover, the device 100 includes circuitry to provide soft information of encoded bits, shown in FIG. 1 as Soft Information Measurement Circuit 150, for improved decoding and signal processing.

In some implementations, the device 100 is employed in wireless digital communication employing Forward Error Correction (FEC). Wireless digital communication devices, such as Bluetooth enabled devices, use FEC techniques for sending and receiving information with minimal or no error, while utilizing the available bandwidth. To this end, the transceiver 140 includes a soft information measurement circuit 150 to determine the soft information of the encoded bits that are received. The soft information is provided to other elements of the transceiver 140 as information supplementing the decoded bits, to be used in various signal processing techniques, thus potentially improving its performance. For example, in some implementations, the transceiver 140 uses calculations from the soft information measurement circuit 150 in implementing various FEC algorithms, such as the Viterbi algorithm. Accordingly, the soft information of encoded bits can be used to improve signal processing aspects, like decoding, in instances where the device 100 is employed in noisy communication channels.

The soft information measurement circuit 150 adds preselected redundant information (e.g., redundant bits), which are collectively referred to as soft information, to the data being transmitted through a channel. The soft information is used in conjunction with FEC and modulation techniques to improve the capacity of the channel. In some implementations, the transceiver 140 in the device 100 processes communication signals using Gaussian Frequency Shift Keying (GFSK) modulation, which is a type of CPM. In accordance with GFSK modulation, BLR information bits are encoded with half (½) rate convolutional coder. Convolutional coding is a form of channel coding. Convolutional codes operate on serial data, for example one or a few bits at a time. For example, in some implementations, device 100 set in a specified BLR operational mode (e.g., 500 kbps) uses GFSK modulated using a determined modulation index (e.g., 0.5) for the encoded bits. In some implementations, in another BLR operational mode (e.g. 125 kbps) device 100 maps each "1" of an encoded bit to "0011", and each "0" of an encoded bit to "1100" pattern. After the device 100 performs the 1:4 pattern mapping, the final output is GFSK modulated and transmitted by transceiver 140.

Modulation techniques employed in a communication system can affect the quality of the signal received. As an example, characteristics of the modulation technique can effect a signal's immunity to noise. Thus, implementing the soft information measurement circuit 150 can counteract any potentially signal degrading effects of modulation to enhance performance of decoding the received coded information sequences to recover the original data. Thus, decoding using soft information, according to the techniques described here, can realize signal processing schemes (e.g., FEC) that are robust and that offers high error resiliency (e.g., lower BER). In some instances, block coding is used as an alternative to convolution coding.

In some implementations, the transceiver 140 in the device 100 processes communication signals using Gaussian Phase Shift Keying (GPSK) modulation, which is a type of CPM. For example, the transceiver 140 can be a Bluetooth™ device that processes Bluetooth's Basic Data Rate (BDR) signals and/or Bluetooth Low Energy (BLE) signals, which use GPSK modulation. Additionally or alternatively, the transceiver 140 processes communication signals that use other forms of CPM, such as Global System for Mobile Communications (GSM™) signals, and/or Institute of Electrical and Electronics Engineers (IEEE) 802.11™ Frequency Hopping Spread Spectrum (FHSS) signals, among other suitable signaling schemes. Accordingly, the transceiver 140 can apply the techniques disclosed in this application, e.g., estimating the frequency offset of a received CPM signal and performing CPM signal compensation using the estimated frequency offset, estimating varying modulation index values used in a received CPM signal, or decoding information symbols encoded in the phase of a received CPM signal, to Bluetooth signals, GSM signals, or IEEE 802.11 FHSS signals, among other signal types.

Figure 2:
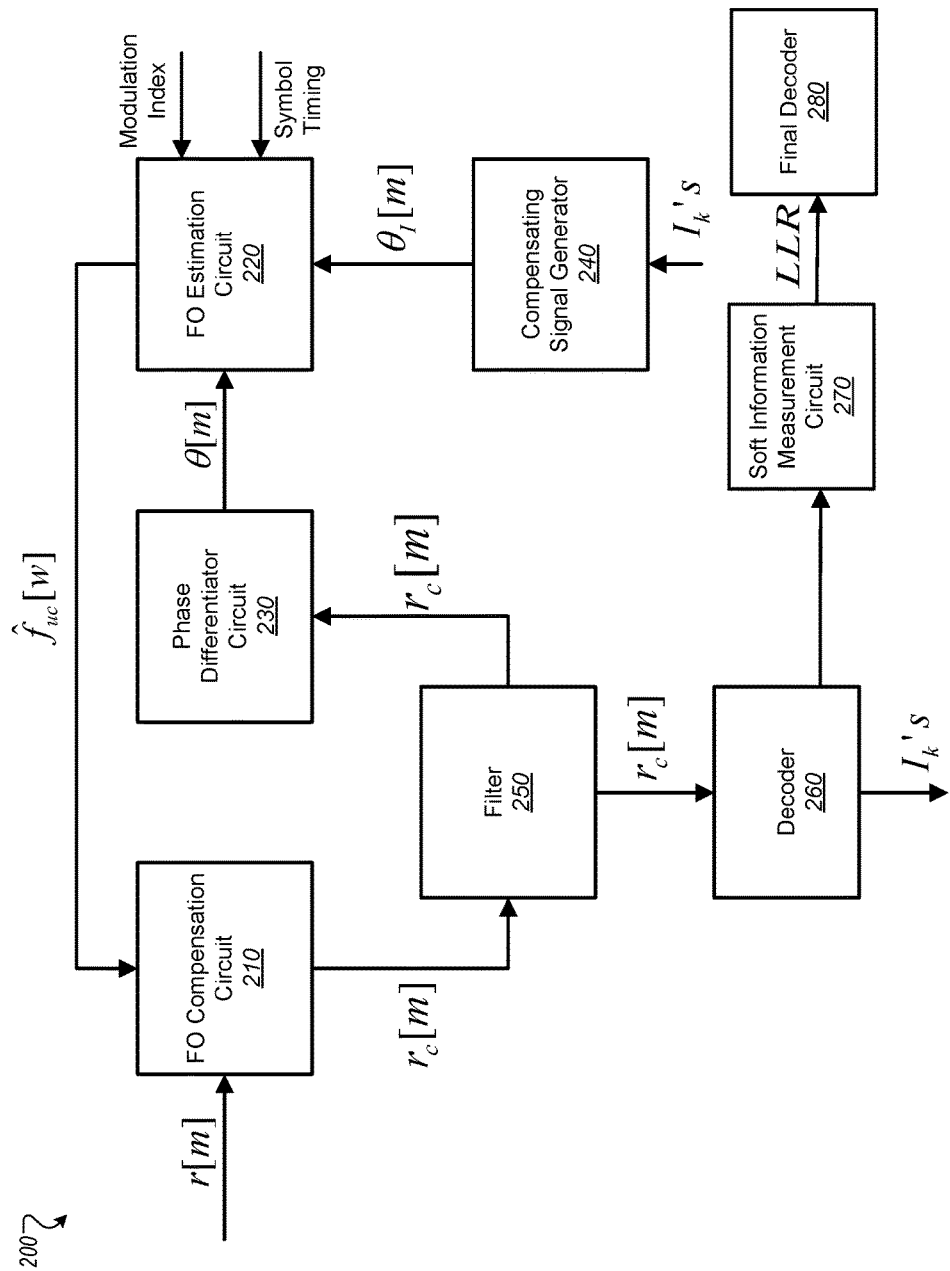
FIG. 2 illustrates an example of a block diagram of circuit components of a transceiver that are used for CPM signal processing and soft information measurement, according to one or more implementations.

FIG. 2 illustrates an example of a block diagram of circuit components of a transceiver that are used for CPM signal processing and soft information measurement, according to one or more implementations. As shown, the transceiver 200 includes a frequency offset (FO) compensation circuit 210, a frequency offset (FO) estimation circuit 220, a phase differentiator circuit 230, a compensating signal generator circuit 240, a filter 250, a decoder 260, a soft information measurement circuit 270, and a final decoder 280. In some cases, the transceiver 200 is an implementation of the transceiver 140 of the device 100. Accordingly, the following sections describe the transceiver 200 with respect to the components of the device 100.

In some wireless networking technologies, for example Bluetooth 5, various updates have been implemented which allow for an increased wireless range as compared to some legacy standards. For example, the longer range can be achieved by using operational modes having reduced data rates (e.g., 500 kbps and 125 kbps). Devices operating under these more recent wireless standards, and the reduced data rates, can realize multiple benefits, including but not limited to: allowing more sensors to be used reliably; allowing more distance between a controller and a sensor; and providing a more robust link for the end devices. Thus, to leverage these benefits associated with BLR and reduced data rates, the circuit components used for CPM signal processing and soft information measurement, as disclosed herein, can be specifically configured to function more suitably for a respective data rate. In some implementations, the circuit components in FIG. 2 are configured for 125 kbps data rate in a BLR operational mode for the transceiver. In other implementations, the circuit components in FIG. 2 are configured for 500 kbps data rate in a BLR operational mode for the transceiver. For purposes of discussion, a single configuration is shown in FIG. 2 as an example of the circuit components of a transceiver used for CPM signal processing and soft information measurement. The configuration shown in FIG. 2 can process both 125 kbps and 500 kbps modes, e.g., using a conditional branch, as discussed further below. However, it should be appreciated that multiple various configurations (having similar or different circuit components) can be utilized to implement the CPM signal processing and soft information measurement capabilities as described herein.

Referring to FIG. 2, the FO compensation circuit 210 receives samples r[m] of a CPM baseband signal r(t) that is received at the transceiver 200, where m is the sample index (m being an integer >0), and generates samples $r_c[m]$ that are compensated for estimated frequency offset in the received CPM baseband signal. To do so, the FO compensation circuit 210 takes an uncompensated frequency offset $\hat{f}_{uc}[w]$ computed during a sample window w and generates a frequency offset compensation value $\hat{f}_c[w+1]$ for a sample window w+1 using a programmable multiplier. The FO compensation circuit 210 adjusts (e.g., compensates) the CPM baseband signal in the window w+1 using the frequency offset compensation value $\hat{f}_c[w+1]$.

The phase differentiator circuit 230 receives the adjusted or compensated CPM signal samples $r_c[m]$ through the filter 250, and determines a phase θ[m] of the current signal sample based on the past signal samples. The phase θ[m] is provided to the FO estimation circuit 220.

The FO estimation circuit 220 generates the uncompensated frequency offset $\hat{f}_{uc}[w]$ for the window w based on the phase values θ[m] of different signal samples m received from the phase differentiator 230, and using compensating signal phase values $θ_f[m]$ provided by the compensating signal generator 240. The FO estimation circuit 220 provides the uncompensated frequency offset $\hat{f}_{uc}[w]$ to the FO compensation circuit 210 through a feedback loop. In addition, the FO estimation circuit 220 receives, from other external sources, the modulation index values used by the transmitter device for the CPM baseband signal. In some implementations, the FO estimation circuit 220 receives the modulation index values from a MI estimation circuit, as described in greater detail in the following sections. In applying corrected value of modulation index, the values of other signal processing parameters, such as new_c_array and thus nc_mag, may have improved accuracy. In this manner, applying a proper estimate of modulation index gives improved values for soft information that is being computed. According to the soft information measurement techniques, the FO estimation circuit 220 receives a set, or otherwise specified modulation index value. As an example, modulation index can be set to 0.5, but it should be appreciated that other modulation index values can be employed as deemed appropriate.

The compensating signal generator 240 generates the compensating signal phase values $θ_f[m]$ based on information symbols $I_k$'s included in the baseband signal. In some implementations, the information symbols are provided to the compensating signal generator 240 by the decoder circuit 260, which obtains the information symbols by decoding the adjusted or compensated baseband signal samples $r_c[m]$ received from the filter 250.

The filter 250 is a low pass filter. In some implementations, the filter 250 is a pulse-shaping filter that is configured to filter out abrupt changes in the phase of the received CPM baseband signal, thereby leading to a smooth transition of phase of the received CPM baseband signal. In some implementations, the frequency response of the filter 250 matches the frequency response of a filter that is used by the transmitter device. Operations of the circuit components of the transceiver 200 compensating for a CPM baseband signal r(t) received at the transceiver 200 are describe in greater detail as disclosed in U.S. patent application Ser. No. 15/097,026 entitled "CONTINUOUS PHASE MODULATION SIGNALING", filed Apr. 12, 2016, now U.S. Pat. No. 9,699,011, which is incorporated herein by reference in its entirety.

The transceiver 200 uses various circuit components to estimate frequency offset for a received CPM baseband signal, and uses the estimated value of the frequency offset to compensate for the frequency mismatch between the transmitter and the receiver. These system and techniques are described in greater detail as disclosed in U.S. patent application Ser. No. 15/097,026 entitled "CONTINUOUS PHASE MODULATION SIGNALING", filed Apr. 12, 2016, now U.S. Pat. No. 9,699,011, which is incorporated herein by reference in its entirety.

The above-disclosed techniques can help in precisely estimating the time varying frequency offset in the received signal for low SNRs. Compensating the received CPM signal with the estimated frequency offset can also lead to significant improvement in receiver sensitivity and the decoding ability of the transceiver 200.

As noted previously, in some situations, transmitters use varying modulation index h values for different packets that are transmitted as part of a CPM signal. In some implementations, for an incoming packet, the receiver, e.g., the transceiver 200 in the device 100, does not know apriori the actual value of the modulation index used by the transmitter to transmit the packet using CPM modulation. In such implementations, the transceiver 200 estimates the modulation index values used by the transmitter, as described in the following sections.

In some implementations, the transceiver 200 uses the decoder 260 to perform the decoding operations, and the soft information measurement circuit 270 to perform the soft information measurement operations. The following sections describe the decoder 260 performing the decoding operations to decode n−1 information symbols. Also, the sections describe the soft information measurement circuit 270 calculating the soft information related to the decoded information symbols, which are represented as $I_m$, where k<m≤k+n−1, with k, l and m being integers. However, the operations are also applicable to decode and measure soft information for other information symbols.

In some implementations, when the data rate is 125 kbps, the circuitry sets n to five, and thus the transceiver is configured to decode n−1 information symbols encoded in the CPM signal. Also, the circuitry sets k to $4b_{enc}$, where $b_{enc}$ represents the encoded bit number. In the scenario of a 125 kbps operational mode for the components illustrated in FIG. 2, every encoded bit is mapped to 4 bits. Accordingly, the index (e.g., starting bit) to an encoded information symbol can be represented as $k=4b_{enc}$. For instance, for the $0^{th}$ encoded bit, $b_{enc}$ is 0, accordingly k is set to 0. Continuing to refer to the example of four encoded information symbols, each of the subsequent $b_{enc}^{th}$ encoded bits can be represented as: $b_{enc}$=1, k=4; $b_{enc}$=2, k=8; and $b_{enc}$=3, k=12. In some cases, the decoder 260 receives values specific to the soft information operations from other sources, e.g., the value of can be set by a user of the device 100. As an example, the decoder 260 can receive the values for n and k from the soft information circuit 270. In this case, soft information measurement circuit is 270 configured to compute soft information for each $b_{enc}^{th}$ encoded bit (where $b_{enc}$ is a multiple of 1).

In cases where the data rate is 500 kbps, the circuitry for soft information generator 270 sets k to $b_{enc}$, where $b_{enc}$ represents the encoded bit number. Thus, soft information circuit 270 computes the soft information of four encoded symbols within a period, rather than a single bit as previously discussed. For instance, for the $0^{th}$ encoded bit, $b_{enc}$ is zero; accordingly, k is set to zero. Continuing to refer to the example of four encoded information symbols, each of the subsequent $b_{enc}^{th}$ encoded bits can be represented as: $b_{enc}$=4, k=4; $b_{enc}$=8, k=8; and $b_{enc}$=12, k=12. In this case, soft information measurement generator is 270 computes soft information for four bits associated with index $b_{enc}$ (where $b_{enc}$ is a multiple of 4, and assumes values 0, 4, 8, 12). In this implementation, based on the 500 kpbs operational mode, the soft information measurement circuit 270 computes soft information for four encoded symbols, which are indexed, $b_{enc}^{th}$, $(b_{enc+1})^{th}$, $(b_{enc+2})^{th}$, $(b_{enc+3})^{th}$, represented as $LLR\_b_{enc+m}$, To decode the $I_m$ information symbols, the decoder 260 processes the received CPM baseband signal r(t) for the duration kT<t≤(k+n)T, where T is a symbol duration. Additionally, the decoder 260 can generally process signals of other symbol durations. However is should be appreciated that the aforementioned duration is used for purposes of discussion. As an initial operation, the decoder 260 generates a number digital signals as elements of an array of correlation signals, where the array is referred to as corr_sig_array. Each digital signal element of the corr_sig_array is generated to be of length $T/T_s$ samples. $T_s$ is the sampling rate of r(t). In some implementations, the decoder 260 generates four elements for the corr_sig_array. Each element of corr_sig_array is generated as shown in equation (5).

$$\text{corr\_sig\_array}[\text{corr\_no}, idx] = e^{j[2\pi h I_{l-1} q[(idx)T_s+T)] + 2\pi h I_l q[(idx)T_s)]]} \quad (5)$$

Considering the case where four digital signals are generated, 0<corr_no<3 and 0≤idx<$T/T_s$. In equation (15), corr_no denotes one of the corr_sig_array signals that is addressed, while idx indicates a sample of a particular digital signal element of the corr_sig_array.

In some implementations, four digital signal elements are generated for the corr_sig_array, since for a given corr_no, the information symbol pair {$I_l$, $I_{l-1}$} can hold one of four values, as shown by Table I. The following sections describe the operations of the decoder 260 by considering the corr_sig_array as including four digital signal elements.

TABLE 1

| corr_no | $I_{l-1}$ | $I_l$ |
|---|---|---|
| 0 | −1 | −1 |
| 1 | −1 | 1 |
| 2 | 1 | −1 |
| 3 | 1 | 1 |

Following the generation of the corr_sig_array, while receiving the CPM baseband signal r(t) for a first symbol duration kT<t≤(k+1)T that is considered for decoding the information symbols, the decoder correlates samples r[m] of the CPM signal with each of the digital signal elements of corr_sig_array to generate a branch matrix, bm_acc_array, as shown by equation (6).

$$\text{bm\_acc\_array}[\text{corr\_no}] = \sum_{idx=0}^{\frac{T}{T_s}-1} r\left[\frac{kT}{T_s} + idx\right] * conj(\text{corr\_sig\_array}(\text{corr\_no}, idx)) \quad (6)$$

In equation (16), conj(x) represents the complex conjugate of x. In some implementations, the decoder correlates compensated samples $r_c[m]$, which are compensated for frequency offset between the transmitter of the CPM signal and the transceiver 200, as described previously, e.g., by the FO compensation circuit 210. The correlation values of a sample r[m] with the elements of the corr_sig_array are stored as elements of the branch matrix bm_acc_array, as shown by equation (16). Since four digital signal elements of corr_sig_array are correlated, four resulting correlation values are stored in the branch matrix.

The decoder 260 creates two cost matrices, new_c_array and old_c_array, and stores the branch matrix values computed above in the two cost matrices, as shown by equation (7). Since initially four correlation values are generated for the branch matrix, each of new_c_array and old_c_array includes four elements.

new_c_array[i]=old_c_array[i]=bm_acc_array[i]  (7)

where 0<i<3. In the following sections, the elements of the cost matrices new_c_array and old_c_array are referred to as states of the cost matrices, and denoted by st.

Subsequently, for the next symbol duration (k+1)T<t≤(k+2)T, the decoder correlates samples r[m] of the CPM signal with each of the four digital signal elements of corr_sig_array to generate new values for the elements of the branch matrix bm_acc_array, as shown by equation (16). At time t=(k+2)T, the decoder regenerates the cost matrix new_c_array based on the correlation values of the samples previously stored in the cost matrix old_c_array, and using the newly generated branch matrix values, as shown by equation (8).

new_c_array[st]=[old_c_array⌊st/2⌋+bm_acc_array
[st %4]]$e^{j\pi h(I_w)}$  (8)

where $\lfloor x \rfloor$ denotes the largest integer less than or equal to x, a % b denotes the remainder after a is divided by b, and 0≤st<8. The value of $I_w$ is set as shown by equation (9).

$$I_w = \begin{cases} -1 & \text{if } (st\ \%4) = 0 \text{ or } 1 \\ +1 & \text{if } (st\ \%4) = 2 \text{ or } 3 \end{cases} \quad (9)$$

As shown by equation (18), in regenerating the cost matrix new_c_array, the decoder considers a limited number of states of the cost matrix that were previously computed, indicated by the operation $\lfloor st/2 \rfloor$. In this manner, by limiting the number of previously stored states that are considered to generate the cost matrix new_c_array, the computational complexity of the decoding technique can be limited, compared to other techniques where all previously stored states are used. Accordingly, the decoder 260 can perform the decoding operations in a resource-efficient manner.

Following the regeneration of new_c_array, the cost matrix old_c_array is also regenerated based on the updated states of new_c_array, as shown by equation (10).

old_c_array[i]=new_c_array[i]  (10)

where 0<i<8. As indicated by equations (19) and (20), following the regeneration of the cost matrices at t=(k+2)T for the new symbol duration, each of new_c_array and old_c_array includes eight states.

The decoder applies the above operations iteratively after every symbol duration T. Since additional information symbols can be present in a new symbol duration that is considered, the number of states of new_c_array and old_c_array are increased following regeneration for each new symbol duration that is considered. Since each new information symbol can take one of two values (e.g., +1 or -1), the number of states increases by a factor of 2 after each symbol duration is processed. Accordingly, at time t=(k+$s_0$)T, where $s_0$<n, old_c_array includes $2^{s_0+1}$ states. Subsequently, in the symbol duration (k+$s_0$)T<t≤(k+$s_0$+1)T, the decoder 260 correlates the samples r[m] of the CPM baseband signal with each of the four digital signal elements of corr_sig_array to generate new values for the elements of branch matrix bm_acc_array, as shown by equation (11).

$$bm\_acc\_array[corr\_no] = \sum_{idx=0}^{\frac{T}{T_s}-1} y\left[\frac{(k+s_0)T}{T_s} + idx\right] * conj(corr\_sig\_array(corr\_no, idx)) \quad (11)$$

The decoder 260 regenerates the cost matrix new_c_array based on the states previously stored in the cost matrix old_c_array, and using the newly generated branch matrix values, as shown by equation (18). However, in this case, 0≤st<$2^{(s_0+2)}$, since the number of states for the cost matrix has increased to $2^{s_0+2}$. Subsequently, the cost matrix old_c_array is also regenerated based on the updated states of new_c_array, as shown by equation (20), but with 0≤i<$2^{s_0+2}$. Accordingly, at t=(k+$s_0$+1)T, each of new_c_array and old_c_array includes $2^{s_0+2}$ states.

The decoder 260 performs the iterative operations described in the previous sections till the end of the period kT<t≤(k+n)T is reached. Following the above operations, at time t=(k+n)T, the samples in the symbol durations corresponding to the period kT<t≤(k+n)T have been processed, and new_c_array includes $2^{n+1}$ states.

In the techniques disclosed, decoding involves reading the values of the $2^{n}+1$ states included in new_c_array, and identifying the state for which the magnitude of the state value satisfies a predetermined relationship to the values of other states in new_c_array. For example, in some implementations, the decoder 260 identifies the state for which the magnitude of the state value is maximum. In other implementations, the decoder 260 identifies the state for which the magnitude of the state value is minimum.

Considering the implementations in which the decoder 260 identifies the state corresponding to which the magnitude of the state value is maximum in new_c_array, the decoder 260 obtains the state number $st_{max}$, e.g., the index of the row in new_c_array, corresponding to the maximum value of the state out of the $2^{n+1}$ states included in new_c_array at time t (k+n)T. The decoder converts $st_{max}$ from a decimal value to a binary string. The decoder 260 decodes the information symbols based on the bits in the binary string. For example, in some implementations, the decoder 260 reads the second to $n^{th}$ bits of the binary string as the (n-1) information symbols $I_{k+1}$, $I_{k+2}$, . . . , $I_{k+n+1}$. Accordingly, if the bits of the binary form of $st_{max}$ are represented as $b_{n+1}$, $b_n$, $b_{n-1}$, . . . , $b_2$, $b_1$ and $b_0$, where $b_{n+1}$ is the most significant bit (MSB) and $b_0$ is the least significant bit (LSB), then the decoded information symbols can be represented as $I_{k+m}=b_m$, where 1≤m≤n-1. In some other implementations, a different number of bits of the binary string are decoded as the information symbols, or the bits of the binary string are mapped to different information symbols than the above. In some implementations, the decoder 260 performs additional processing operations on the bits of the binary string and obtains the information symbols based on the result of the additional processing operations.

In the manner described above, the transceiver 200 uses the decoder 260 to accurately determine information symbols that are encoded in a received CPM signal, where the CPM signal may be corrupted by noise during transmission. The decoder 260 removes intersymbol interferences (ISI) by correlating the samples in one symbol duration with the symbols in the next symbol duration, using the corr_sig_array elements as described above. By limiting the number of previously computed states that are considered in regenerating the cost matrix for the symbol states, the computational overhead of the decoding operation can be limited, such that the operations are performed in a resource-efficient manner.

As previously discussed, each encoded bit is mapped to four bits, and furthermore each bit corresponds to multiple elements in the array. That is to say, each of the encoded bits is represented by 16 corresponding values included in new_c_array respectively. Thus, at the end of the symbol duration, ending at the period t=(k+5)T, the new_c_array includes 64 states. Each value is described by new_c_array [st], such that 0≤st≤64.

After iterative operations, the soft information measurement circuit 270 receives array new_c_array. In some instances, new_c_array is received by the soft information circuit 270 from the decoder 260. The soft information circuit 270 conditionally applies operations for soft information measurement in accordance with the respective BLR operational mode (e.g., 125 kbps or 500 kbps). Thus, in some implementations where the data rate is 125 kbps, the soft information measurement circuit 270 applies specified operations to the new_c_array, as described in greater detail below in reference to FIG. 3A. In some implementations where the data rate is 500 kbps, the soft information circuit 270 applies specified operations to the new_c_array, as described in greater detail in reference to FIG. 4A. In implementing the techniques disclosed herein, the soft information measurement generator 270 measures, or otherwise calculates, soft information for each $b_{enc}^{th}$ encoded bit, relating to the corresponding encoded information symbol. In some implementations, the resulting soft information measurements for each $b_{enc}^{th}$ bit, LLR_$b_{enc}$, are communicated from the soft information measurement generator 270 to various other component of the transceiver. For example, FIG. 2 illustrates LLR is communicated from the soft information measurement generator 270 to a final decoder 280.

Figure 3A:
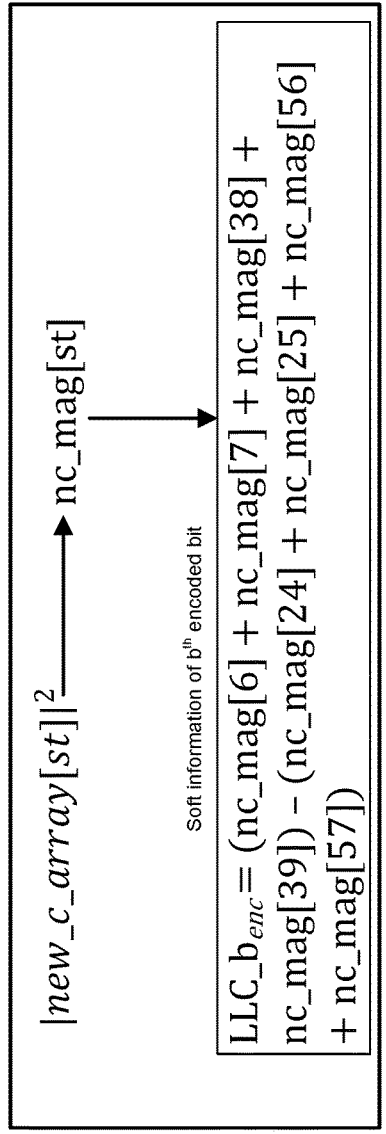
FIG. 3A illustrates an example of soft information measurement operations performed by the soft information measurement circuit when the data rate is 125 kbps, according to one or more implementations.

FIG. 3A illustrates an example of soft information measurement operations performed by the soft information measurement circuit 270 when the data rate is 125 kbps, according to one or more implementations. In this implementation, the soft information circuit 270 operates using a 125 kbps data rate and particularly applies the operations illustrated in FIG. 3A to perform its soft information measurement processing. As previously discussed, decoding can be performed during the symbol durations corresponding to a period, kT<t≤(k+5)T. At the end of the period, the resulting decoding information, new_c_array, is generated. FIG. 3A shows a soft information measurement operations which involves computing the square magnitude of new_c_array [st] and storing the values in another array, nc_mag[st]. Thus, the resulting array, nc_mag[st] is generated having values for all states of the decoding array, which is 0≤st<64 in this example. The soft information measurement circuit 270 is then configured to compute soft information for a $b_{enc}^{th}$ encoded bit, LLR_$b_{enc}$ using the states array nc_mag [st] as shown by equation (12).

$$LLR\_b_{enc} = (nc\_mag[6] + nc\_mag[7] + nc\_mag[38] + nc\_mag[39]) - (nc\_mag[24] + nc\_mag[25] + nc\_mag[56] + nc\_mag[57]))$$ (12)

Figure 3B:
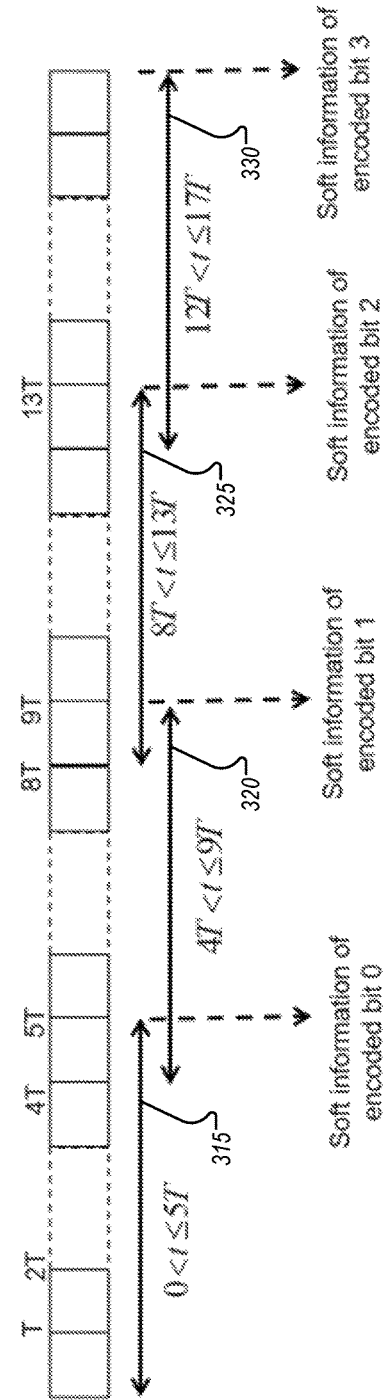
FIG. 3B illustrates a diagram of decoding and soft information measurement of encoded bits implemented by the circuit components of FIG. 2, when the data rate is 125 kbps, according to one or more implementations.

FIG. 3B illustrates a diagram of decoding and soft information measurement of encoded bits implemented by the circuit components of FIG. 2, when the data rate is 125, according to one or more implementations. As indicated above, the transceiver receives a CPM baseband signal r(t) and processes the signal, as illustrated in FIG. 3B, in discrete non-overlapping blocks, which are referred to as windows 310, e.g., window 1, window 2, . . . , window w, and window w+1, among others. In some implementations, each window 310 is of a time duration, referred to as symbol duration T, which is the time duration of a symbol encoded in the CPM signal using a suitable time unit (e.g., milliseconds, microseconds, or nanoseconds). In this context, a symbol duration refers to a length of time for which an information symbol is transmitted. In order to decode one or more information symbols, $I_m$, windows 310 are processed for the period kT<t≤(k+5)T according to the disclosed techniques.

FIG. 3B illustrates successive periods for measuring the soft information corresponding to multiple encoded bits. FIG. 3B is intended to illustrate that soft information for a single bit is measured by processing the signal in each respective period. Shown in FIG. 3A are four periods 315, 320, 325, and 330, where each period includes windows 310 corresponding to multiple symbol durations. According to the techniques of FIG. 3A, each of these periods is used for processing a portion of the received signal to decode and derive related soft information for each encoded bit. Thus, the portion of the encoded signal received in period 315 is used for processing soft information for encoded bit number 0. Similarly, period 320 processes the soft information for encoded bit number 1, period 325 processes the soft information for encoded bit number 2, and period 330 processes the soft information for encoded bit number 3. In some implementations, each period is an interval of suitable time unit (e.g., milliseconds, microseconds, or nanoseconds), such as 4 µs, where the soft information of one encoded symbol is computed.

A first period 315 is shown for processing an encoded bit 0, where k=0. Accordingly, the first period 315 for performing the decoding and soft information processing for the signal can be defined by kT<t≤(k+5)T, which is particularly 0<t≤5T in this example. As illustrated in FIG. 3B, the first period 315 includes processing for one or more windows 310 within multiple symbol durations, including T, 2T, 4T, and 5T. These windows 310 include a portion of the CPM baseband signal r(t) with information symbols encoded therein. In referring back to FIG. 3A, the soft information measurement circuit 270 receives an array, namely new_c_array, that is generated from applying the previously disclosed techniques to decode the information symbol for the symbol durations (i.e., T to 5T) within this first period 315, represented in encoded bit 0. Thereafter, the soft information for the encoded bit 0, corresponding to this first period 315, is measured by applying the soft measurement operations (discussed referring to FIG. 3A) to the array resulting from decoding performed during the period. In accordance with the techniques illustrated in FIG. 3A, the soft information operations is employed iteratively for each of the subsequent periods 320, 325, and 330. Thus, the techniques can measure soft information for an encoded bit corresponding to each of the periods. FIG. 3B illustrates measuring soft information for a $b_{enc}^{th}$ encoded bit (LLR_$b_{enc}$) where $b_{enc}$ is 0, 1, 2, or 3.

Thus, the abovementioned process is repeated for the remaining periods illustrated in FIG. 3B. That is, the next period 320 for measuring the soft information for encoded bit 1, where k=4, can be defined by kT<t≤(k+5)T, which is particularly 4T<t≤9T in this example. Period 325 for measuring the soft information for encoded bit 2, where k=4, is particularly 8T<t≤13T. Period 330 for measuring the soft information for encoded bit 3, where k=12 is 12T<t≤17T. Soft information processing for the remaining periods can generally be described as applying the soft information operations of FIG. 2A to the decoded information calculated within a respective period, which is the new_c_array that is iteratively generated for each of the periods. In some cases, some (or all) of the soft information values calculated using the aforementioned techniques can be scaled for optimal fixed point implementation.

Figure 4A:
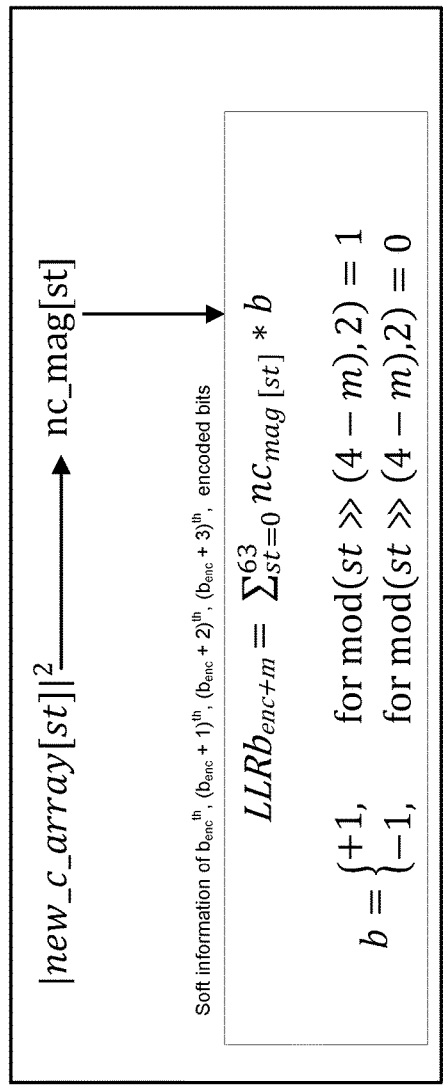
FIG. 4A illustrates an example of soft information measurement operations performed by the soft information measurement circuit when the data rate is 500 kbps, according to one or more implementations.

FIG. 4A illustrates an example of soft information measurement operations performed by the soft information measurement circuit 270 when the data rate is 500 kbps, according to one or more implementations. FIG. 4A shows soft information measurement operations which involve computing the square magnitude of new_c_array[st] and storing the values in another array, nc_mag[st]. The soft information measurement circuit 270 then computes soft information for four encoded symbols with indices, $b_{enc}{}^{th}$, $(b_{enc}+1)^{th}$, $(b_{enc}+2)^{th}$, $(b_{enc}+3)_{th}$, LLR_$b_{enc+m}$, using the states array nc_mag[st] as shown by equation (13).

$$LLR_{b_{enc}+m} = \sum_{st=0}^{63} \text{nc\_mag}[st] * b \quad (13)$$

$*$ : denotes multiplication, $0 \leq m \leq 3$ $b = \begin{cases} +1 \text{ for } \mod(st \gg (4-m), 2) = 1 \\ -1 \text{ for } \mod(st \gg (4-m), 2) = 0 \end{cases}$ $\gg$ : denotes bit – shift operation.

Figure 4B:
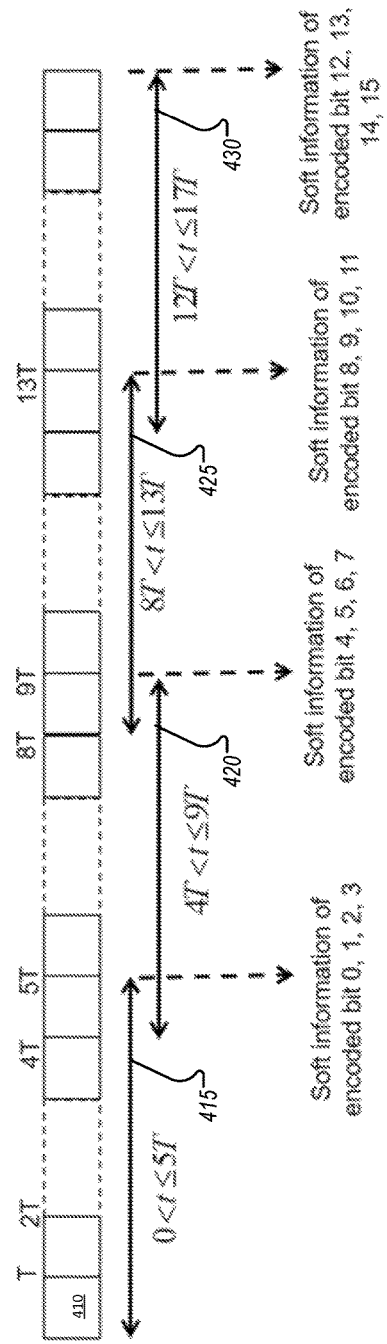
FIG. 4B illustrates a diagram of decoding and soft information measurement of encoded bits implemented by the circuit components of FIG. 2, when the data rate is 500 kbps, according to one or more implementations.

FIG. 4B illustrates a diagram of decoding and soft information measurement of encoded bits implemented by the circuit components of FIG. 2, when the data rate is 500 kbps, according to one or more implementations. FIG. 4B shows successive periods for measuring the soft information corresponding to multiple encoded bits. In general, FIG. 4B can be described as performing the decoding and soft measurement techniques discussed in detail in reference to FIG. 3B. However, FIG. 4B is intended to illustrate that, in accordance with the operations in FIG. 4A, soft information is measured for four encoded symbols in a respective period, rather than a single encoded symbol. Shown in FIG. 4B are four periods 415, 420, 425, and 430, where each period includes windows 410 corresponding to multiple symbol durations. FIG. 4B illustrates that soft information of four encoded bits is obtained within each of the periods 415, 420, 425, and 430. As illustrated, a first period 415 for measuring the soft information for encoded bits 0, 1, 2, and 3 is defined by 0<t≤5T in this example. Period 420 for measuring the soft information for encoded bits 4, 5, 6, and 7 is 4T<t≤9T. Period 425 for measuring the soft information for encoded bits 8, 9, 10, and 11 is 8T<t≤13T. Period 430 for measuring the soft information for encoded bits 12, 13, 14, and 15 is 12T<t≤17T. The soft information measurement operations, described in reference to FIG. 4A, can be repeatedly applied to each period illustrated in FIG. 4B.

As noted previously, in some situations, a CPM signal that is received at the device 100 is corrupted during transmission from a transmitter, e.g., due to noise in the transmission channel, or environmental impairments. In such cases, as described in the following sections, the transceiver 140 in the device 100 can use a resource-efficient decoding technique to decode the corrupted CPM baseband signal that is received, and accurately obtain the information symbols encoded in the phase of the CPM signal. As described previously, the transceiver 200 is an example of the transceiver 140 in some implementations. Accordingly, the following sections describe the decoding operations with respect to the transceiver 200.

Figure 5:
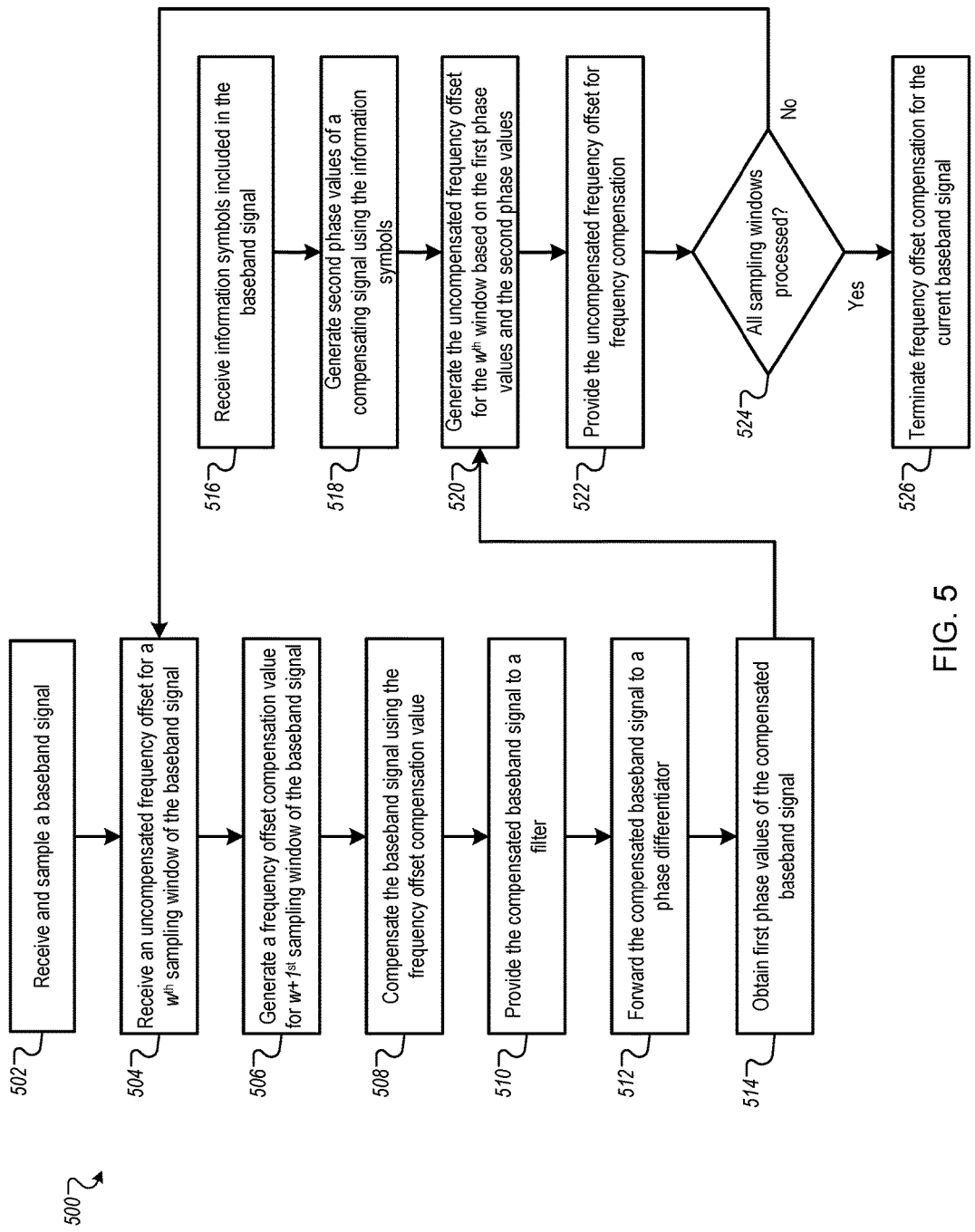
FIG. 5 illustrates an example of a process for frequency offset compensation of a received CPM signal, according to one or more implementations.

FIG. 5 illustrates an example of a process 500 for performing frequency offset compensation of a received CPM signal, according to one or more implementations. The process 500 can be performed by a transceiver, e.g., the transceiver 140 of the device 100, when the transceiver receives a CPM baseband signal from another transmitter device. As described previously, the transceiver 200 is an example of the transceiver 140 in some implementations. Accordingly, the following sections describe the process 500 with respect to the transceiver 200. However, the process 500 also may be performed by other suitable devices.

In some implementations, the process 500 is performed by one or more processors associated with the transceiver 200, which execute instructions stored in memory coupled to the transceiver. For example, the CPU 110 can execute instructions stored in the memory 120 to perform the operations corresponding to the circuit components of the transceiver 200 for frequency offset compensation.

At 502, a baseband signal is received and sampled. For example, the transceiver 200 receives a CPM baseband signal r(t). The transceiver 200 processes the CPM signal in discrete non-overlapping blocks or windows, e.g., window 1, window 2, . . . , window w, and window w+1, among others. In each window, the transceiver 200 obtains samples r[m] of the signal r(t).

At 504, an uncompensated frequency offset for a $w^{th}$ sampling window of the baseband signal is received. For example, the FO compensation circuit 210 receives, from the FO estimation circuit 220, the uncompensated frequency offset $\hat{f}_{uc}[w]$ that is estimated by the FO estimation circuit 220 for the window w.

At 506, a frequency offset compensation value for the $w+1^{st}$ sampling window of the baseband signal is generated. For example, the FO compensation circuit 210 multiplies the uncompensated frequency offset $\hat{f}_{uc}[w]$ by the multiplier value µ using the multiplier circuit 212. The FO compensation circuit 210 adds the output $\mu\hat{f}_{uc}[w]$ of the multiplier circuit 212 to a compensated frequency offset value $\hat{f}_c[w]$ previously computed for the window w, using the adder circuit 216. The output of the adder circuit 216 is the compensated frequency offset value $\hat{f}_c[w+1]$ for the window w+1, as described with respect to equation (5).

At 508, the baseband signal is compensated using the frequency offset compensation value. For example, the FO compensation circuit 210 computes the value exp(j2Ξ$\hat{f}_c$[w+1]) and uses the multiplier circuit 214 to multiply the uncompensated CPM baseband signal sample r[m] with the computed value exp(j2Ξ$\hat{f}_c$[w+1]). The output of the multiplier circuit 214 is the compensated CPM baseband signal sample $r_c$[m] for the window w+1, as described with respect to equation (6).

At 510, the compensated baseband signal is provided to a filter. For example, the FO compensation circuit 210 forwards the compensated CPM baseband signal samples $r_c$[m] to the filter 250.

At 512, the compensated baseband signal is forwarded to a phase differentiator. For example, the filter 250 forwards the compensated CPM baseband signal samples $r_c$[m] to the phase differentiator circuit 230. Additionally, in some implementations, the filter 250 forwards the compensated CPM baseband signal samples $r_c$[m] to the decoder 260.

At 514, first phase values of the compensated baseband signal are obtained. For example, the phase differentiator circuit 230 uses the multiplier circuit 232 to multiply the present input sample $r_c$[m] continuously with compensated samples $r_c[m-T/T_s]$ received corresponding to the past T symbol duration, to generate the output $r_c^o[m]$, as described with respect to equation (7). Subsequently, the phase differentiator circuit 230 computes the angle of $r_c^o[m]$ continuously using the angle determiner circuit 234 to obtain the phase $\Pi[m]=\angle r_c^o[m]$. The phase differentiator circuit 230 forwards the phase $\Pi[m]$ to the FO estimation circuit 220.

At 516, information symbols included in the baseband signal are received. For example, the compensating signal generator circuit 240 receives as input the information symbols $I_k$'s that are encoded in the phase of the received CPM baseband signal. In some implementations, the decoder circuit 260 forwards the information symbols to the compensating signal generator circuit 240 after decoding the compensated CPM signal $r_c[m]$, which the decoder 260 receives from the filter 250.

At 518, second phase values of a compensating signal are generated using the information symbols. For example, the compensating signal generator circuit 240 generates a compensating signal phase $\theta_I[m]$ for the window w based on the information symbols $I_k$'s, as described with respect to equation (8). The compensating signal generator 240 forwards the compensating signal phase values $\theta_I[m]$ to the FO estimation circuit 220.

At 520, the uncompensated frequency offset for the $w^{th}$ window is generated based on the first phase values and the second phase values. For example, the FO estimation circuit 220 receives the phase values $\Pi[m]$ from the phase differentiator circuit 230, and the compensating signal phase values $\theta_I[m]$ from the compensating signal generator circuit 240. The FO estimation circuit 220 also receives, from other external sources, the modulation index values used by the transmitter device for the CPM baseband signal. In some implementations, the FO estimation circuit 220 receives estimated modulation index values from an MI estimation circuit. The FO estimation circuit 220 also receives the symbol timing characteristics. The FO estimation circuit 220 computes an estimated value of the uncompensated frequency offset $\hat{f}_{uc}[w]$ for window w using the phase values $\Pi[m]$ and the compensating signal phase values $\theta_I[m]$, as described with respect to equation (9).

At 522, the uncompensated frequency offset is provided for frequency compensation. For example, the FO estimation circuit 220 forwards the estimated value of the uncompensated frequency offset $\hat{f}_{uc}[w]$ for the window w to the FO compensation circuit 210 through the feedback loop. The FO compensation circuit 210 uses $\hat{f}_{uc}[w]$ to compensate for the frequency offset in the CPM baseband signal for the window w+1, as described above with respect to 504, 506 and 508.

At 524, a determination is made whether all sampling windows have been processed. For example, the transceiver 200 checks if there are additional samples of the baseband signal for which frequency offset compensation has not been performed.

If a determination is made at 524 that not all sampling windows have been processed, then the process 500 returns to 504 to perform frequency offset compensation for the remaining sampling windows of the baseband signal. On the other hand, if a determination is made at 524 that all sampling windows have been processed, then at 526 the frequency offset compensation for the current baseband signal is terminated, until a next baseband signal is received. For example, the transceiver 200 stops performing further frequency offset compensation on the currently received baseband signal. However, the transceiver 200 performs the process 200 again when a new CPM baseband signal is received.

Figure 6:
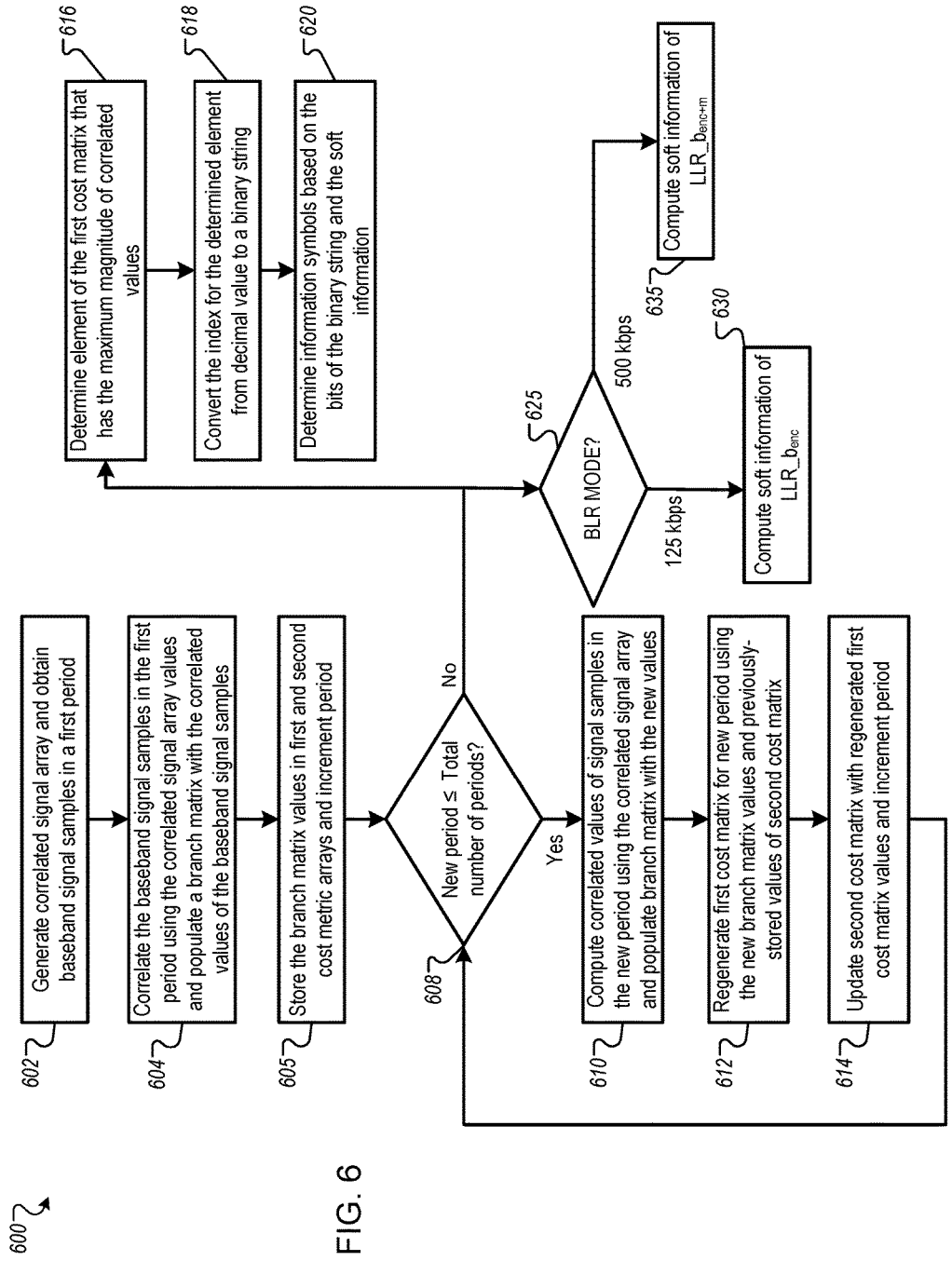
FIG. 6 illustrates an example of a process for decoding and soft information measurement for information symbols that are encoded in a received CPM signal, according to one or more implementations.

FIG. 6 illustrates an example of a process 600 for decoding and measuring soft information relating to information symbols that are encoded in a received CPM signal, according to one or more implementations. The process 600 can be performed by a transceiver, e.g., the transceiver 140 of the device 100, when the transceiver receives a CPM baseband signal from another transmitter device. As described previously, the transceiver 200 is an example of the transceiver 140 in some implementations. Accordingly, the following sections describe the process 600 with respect to the transceiver 200. However, in some implementations the process 600 also may be performed by other suitable devices.

In some implementations, the process 600 is performed by one or more processors associated with the transceiver 200, which execute instructions stored in memory coupled to the transceiver. For example, the CPU 110 can execute instructions stored in the memory 120 to perform the operations corresponding to the circuit components of the transceiver 200 for decoding the information symbols.

At 602, a correlated signal array is generated and baseband signal samples in a first period are obtained. For example, the decoder 260 generates digital signals as elements of the array corr_sig_array, as described with respect to equation (15). Following the generation of the corr_sig_array, the decoder processes samples r[m] of the baseband CPM signal r(t) for a first symbol duration $kT<t\le(k+1)T$. The samples r[m] are provided to the decoder by the filter 250. In some implementations, the samples are $r_c[m]$, which are compensated for frequency offset between the transmitter of the CPM signal and the transceiver 200, as described previously, e.g., by the FO compensation circuit 210.

At 604, the baseband signal samples in the first period are correlated using the correlated signal array values and a branch matrix is populated with the correlated values of the baseband signal samples. For example, for the symbol duration $kT<t\le(k+1)T$, the decoder correlates samples r[m] of the CPM signal with each of the digital signal elements of corr_sig_array to generate the branch matrix bm_acc_array, as described with respect to equation (16).

At 606, the branch matrix values are stored in first and second cost metric arrays and the period is incremented. For example, the decoder 260 creates two cost matrices, new_c_array and old_c_array, and stores the branch matrix values computed above in the two cost matrices, as described with respect to equation (17). The decoder 260 then considers the next symbol duration $(k+1)T<t\le(k+2)T$.

At 608, a determination is made whether the new period is less than or equal to the total number of periods under consideration. For example, the decoder 260 processes the received CPM baseband signal r(t) for the period $kT<t\le(k+n)T$, which includes n symbol durations. Accordingly, at 608, the decoder 260 checks whether the $n^{th}$ symbol duration period is completed, e.g., whether $t=(k+n)T$.

If at 608 it is determined that the new period is less than or equal to the total number of periods under consideration, illustrated in the process 600 as "Yes", then at 610 correlated values of signal samples in the new period are computed using the correlated signal array and the branch matrix is populated with the new values. For example, when the new period is $(k+1)T<t\le(k+2)T$, where n>2, then the decoder 260 correlates samples r[m] of the CPM signal with each of the digital signal elements of corr_sig_array to generate new values for the elements of the branch matrix bm_acc_array, as described with respect to equation (16).

At 612, the first cost matrix is regenerated for new period using the new branch matrix values and previously stored values of second cost matrix. For example, at time $t=(k+2)T$, the decoder 260 regenerates the cost matrix new_c_array based on the correlation values of the samples stored in the cost matrix old_c_array during the previous period $kT<t\leq(k+1)T$ and using the new branch matrix values generated during the current period $(k+1)T<t\leq(k+2)T$, as described with respect to equations (18) and (19).

At 614, the second cost matrix is updated with regenerated first cost matrix values and the period is incremented. For example, following the regeneration of new_c_array during the period $(k+1)T<t\leq(k+2)T$, the decoder 260 regenerates the cost matrix old_c_array based on the updated states of new_c_array, as described with respect to equation (20). The decoder 260 then increments the time period and reverts to 608 to determine whether the incremented period is within the total number of periods under consideration. The decoder performs the operations at 610, 612 and 614 iteratively, as described with respect to equation 21, until the end of the $kT<t\leq(k+n)T$ is reached.

In some implementations, when it is determined at 608 that the new period exceeds the total number of periods under consideration, illustrated as "No", the process can proceed to 625 to check characteristics of the BLR operational mode, namely the data rate. Alternatively, operational mode information, such as the data rate, is assumed to be known through some external sources. In these cases, when the total number of periods exceeds the total number of periods under consideration at 608, new_c_array has already been computed, and thus the process 600 can start applying the soft information algorithm at this stage by computing nc_mag and moving forward.

FIG. 6 shows 608 having an additional "No" output branch, which involves process 600 including the frequency offset compensation and modulation index estimation techniques disclosed. In this case, if at 608 it is determined that the new period exceeds the total number of periods under consideration, thereafter at 616 an element of the first cost matrix that has the maximum magnitude of correlated values is determined. For example, when the end of the period $kT<t\leq(k+n)T$ is reached, then at time $t=(k+n)T$, the decoder 260 reads the values of the $2^{n+1}$ states included in new_c_array, and identifies the state for which the magnitude of the state value satisfies is maximum, compared to the values of other states in new_c_array.

At 619, the index for the determined element is converted from decimal value to a binary string. For example, upon identifying the state corresponding to which the magnitude of the state value is maximum in new_c_array, the decoder 260 obtains the state number $st_{max}$, e.g., the index of the row in new_c_array, corresponding to an identified state. The decoder converts $st_{max}$ from a decimal value to a binary string.

At 620, information symbols are determined based on the bits of the binary string. For example, upon converting $st_{max}$ from a decimal value to a binary string, the decoder 260 decodes the information symbols of the received CPM baseband signal based on the bits in the binary string. In some implementations, the decoder 260 selects the second to $n^{th}$ bits of the binary string as the (n−1) information symbols $I_{k+1}, I_{k+2}, \ldots, I_{k+n+1}$. However, in some other implementations, a different number of bits of the binary string are decoded as the information symbols, or the bits of the binary string are mapped to different information symbols than the above. In some implementations, the decoder performs further operations on the bits of the binary strings, and derives the information symbols from the results of the operations on the bits.

Referring back to 608 and the "No" output branch to 625, a BLR mode check can performed after determining that the new period has exceeded the total number of periods. At 625 the check is performed to determine an operational mode that is being utilized by the device, for example device 100, to be used in determining the applicable soft information measurement operations. As discussed in detail above, in the case of a BLR operational mode using a 125 kbps data rate, illustrated in the process 600 as the "125 kbps" output branch of 625, the operations for computing soft information for an encoded bit (within a period) are performed. Accordingly, the process 600 proceeds to 630. At 630, the soft information of $LLR\_b_{enc}$ is employed, as discussed in detail in reference to FIG. 3A.

Alternatively, in the case of a BLR operational mode using another data rate (e.g., 500 kbps), illustrated in the process 600 as the "500 kbps" output branch of 625, the operations for computing soft information for multiple encoded bits (within a period) are performed, for example computing soft information for four encoded symbols together. It should be appreciated that a BLR operational mode may employ other data rates not discussed herein, which can similarly be identified by the check at 625 as discussed above. Accordingly, the process 600 proceeds to 635. At 635, the soft information of $LLR\_b_{enc+m}$ is employed, as discussed in detail in reference to FIG. 4A. In some implementations, soft information can be provided to other elements of the transceiver, as information supplementing the decoded bits, to be used in various signal processing techniques, thus potentially improving its performance. For example, the soft information measurements derived at 630 or 635 can be used in implementing various FEC algorithms, such as the Viterbi algorithm.

The disclosed and other examples can be implemented as one or more computer program products, for example, one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A device comprising:
   a frequency offset (FO) compensation circuit configured to generate a frequency offset compensation value;
   a decoder coupled with the FO compensation circuit; and
   a soft information measurement circuit coupled with the decoder;
   wherein the frequency offset compensation circuit is configured to (i) receive a continuous phase modulation (CPM) signal, (ii) adjust the CPM signal in a sampling window based on the frequency offset compensation value, and (iii) provide the adjusted CPM signal to the decoder;
   wherein the decoder is configured to (i) receive the adjusted CPM signal generated by the FO compensation circuit, (ii) decode the adjusted CPM signal to obtain one or more information symbols associated with the CPM signal, (iii) provide the one or more information symbols for soft information generation; and (iv) receive soft information provided by the soft information measurement circuit.

2. The device of claim 1, wherein the one or more information symbols are represented as values corresponding to states included in an array, and
   wherein soft information measurement circuit is configured to:
   (i) determine a data rate that is one of a plurality of data rates including a first data rate and a second data rate;
   (ii) conditioned on determining that the data rate corresponds to the first data rate, compute soft information for each of the one or more information symbols corresponding to a time interval by applying a first group of operations to the array; and
   (iii) conditioned on determining that the data rate corresponds to the second data rate, compute soft information for a specified number of the one or more information symbols corresponding to a time interval by applying a second group of operations to the array.

3. The device of claim 2 wherein the values corresponding to states included in the array are generated by correlating, for a time interval, samples of the CPM signal with a number of digital signals represented as elements of a correlated signal array.

4. The device of claim 2 wherein the time interval is a symbol duration, and wherein the decoder is configured to:
   obtain the one or more information symbols by iteratively decoding the adjusted CPM signal after every symbol duration included in a total time period; and
   determine a number of states included in the array based on the total time period.

5. The device of claim 4, wherein applying the first group of operations comprises:
   calculating a squared magnitude of the array, a result of the calculation being represented as values in a magnitude array, and
   obtaining a difference between specified values of the magnitude array.

6. The device of claim 4, wherein applying the second group of operations comprises:
   calculating a squared magnitude of the array, a result of the calculation being represented as values in a magnitude array, and
   obtaining a summation of specified states of the magnitude array.

7. The device of claim 4, wherein the decoder is further configured to convert at least one value corresponding to a specified state included in the array to a binary string including one or more bits.

8. The device of claim 7, wherein the soft information measurement circuit is further configured to provide the computed soft information to the decoder.

9. The device of claim 8, wherein the decoder is configured to (vi) perform optimized decoding of the received CPM signal using the soft information to obtain the one or more information symbols encoded therein.

10. The device of claim 1, wherein the CPM signal includes a Bluetooth signal.

11. The device of claim 1, wherein the CPM signal is based on Gaussian Phase Shift Keying (GPSK) modulation.

12. The device of claim 1, further comprising:
a frequency offset (FO) estimation circuit that is configured to:
(i) receive first phase values of the adjusted CPM signal,
(ii) receive second phase values of a compensating signal,
(iii) generate an uncompensated frequency offset for a given sampling window based on the first phase values of the adjusted CPM signal and the second phase values of the compensating signal, and
(iv) provide the uncompensated frequency offset for the given sampling window to the frequency offset compensation circuit.

13. The device of claim 12, wherein the FO compensation circuit is further configured to:
(iv) receive the uncompensated frequency offset for a given sampling window of the CPM signal, and
(v) generate the frequency offset compensation value for a next sampling window of the CPM signal based on the uncompensated frequency offset for the given sampling window.

14. The device of claim 13, further comprising:
a compensating signal generator that is configured to:
(i) receive one or more information symbols from the decoder;
(ii) generate the second phase values of the compensating signal based on the one or more information symbols; and
(iii) provide the second phase values of the compensating signal to a FO estimation circuit.

15. The device of claim 14, wherein the FO estimation circuit is further configured to:
(v) obtain information about a modulation index that is used for transmitting the CPM signal;
(vi) obtain information about the sampling window; and
(vii) generate the uncompensated frequency offset for the given sampling window based on the modulation index and the information about the sampling window.

16. The device of claim 15, further comprising:
a phase differentiator circuit coupled between the frequency offset estimation circuit and the frequency offset compensation circuit, wherein the phase differentiator circuit is configured to:
(i) receive the adjusted CPM signal;
(ii) determine the first phase values of the adjusted CPM signal; and
(iii) provide the first phase values of the adjusted CPM signal to the frequency offset estimation circuit.

17. A method comprising:
generating a frequency offset compensation value at a frequency offset (FO) compensation circuit;
receiving, at an input of the FO compensation circuit, a continuous phase modulation (CPM) signal;
adjusting, by the FO compensation circuit, the CPM signal in a sampling window based on the frequency offset compensation value;
providing, from an output of the FO compensation circuit, the adjusted CPM signal to a decoder;
receiving, at an input of the decoder, the adjusted CPM signal generated by the FO compensation circuit;
decoding the adjusted CPM signal to obtain one or more information symbols associated with the CPM signal;
providing, from an output of the decoder, the one or more information symbols for soft information generation; and
receiving, at another input of the decoder, soft information provided by a soft information measurement circuit.

18. The method of claim 17, comprising:
determining, by the soft information measurement circuit, a data rate that is one of a plurality of data rates including a first data rate and a second data rate;
conditioned on determining that the data rate corresponds to the first data rate, computing, by the soft information measurement circuit, soft information for each of the one or more information symbols corresponding to a time interval by applying a first group of operations to an array, wherein the one or more information symbols are represented as values corresponding to states included in the array; and
conditioned on determining that the data rate corresponds to the second data rate, computing, by the soft information measurement circuit, soft information for a specified number of the one or more information symbols corresponding to a time interval by applying a second group of operations to the array.

19. The method of claim 18, wherein the values corresponding to states included in the array are generated by correlating, for a time interval, samples of the CPM signal with a number of digital signals represented as elements of a correlated signal array.

20. The method of claim 18, comprising:
obtaining, by decoder, the one or more information symbols by iteratively decoding the adjusted CPM signal after every symbol duration included in a total time period; and
determining, by the decoder, a number of states included in the array based on the total time period, wherein the time interval is a symbol duration.

21. The method of claim 20, wherein applying the first group of operations comprises:
calculating a squared magnitude of the array, a result of the calculation being represented as values in a magnitude array, and
obtaining a difference between specified values of the magnitude array.

22. The method of claim 20, wherein applying the second group of operations comprises:
calculating a squared magnitude of the array, a result of the calculation being represented as values in a magnitude array, and
obtaining a summation of specified states of the magnitude array.

23. The method of claim 20, comprising:
converting, by the decoder, at least one value corresponding to a specified state included in the array to a binary string including one or more bits.

24. The method of claim 23, comprising:
providing, from an output of the soft information measurement circuit, computed soft information to the decoder; and performing, by the decoder, optimized decoding of the received CPM signal using the soft information to obtain the one or more information symbols encoded therein.

25. The method of claim 17, wherein the CPM signal includes a Bluetooth signal.

* * * * *